(No Model.)

A. BELL.
BED OR FURNITURE SPRING CONNECTION.

No. 323,555. Patented Aug. 4, 1885.

WITNESSES:
Chas. A. Mahony
B. W. Paine

INVENTOR
Alonzo Bell
by his attorney
Chas. A. Rutter.

UNITED STATES PATENT OFFICE.

ALONZO BELL, OF PHILADELPHIA, PENNSYLVANIA.

BED OR FURNITURE SPRING CONNECTION.

SPECIFICATION forming part of Letters Patent No. 323,555, dated August 4, 1885.

Application filed April 1, 1885. (No model.)

*To all whom it may concern:*

Be it known that I, ALONZO BELL, a citizen of the United States, and a resident of the city and county of Philadelphia, and State of Pennsylvania, have invented a new and useful Improvement in Devices for Securing Bed or Furniture Springs Together, of which the following is a specification.

The object of my invention is to furnish a device for connecting the upper ends of bed or furniture springs which will be simple and inexpensive in construction, and which will permit the springs to give in any direction to conform to the shape of the person lying or sitting thereon.

Figure 1:
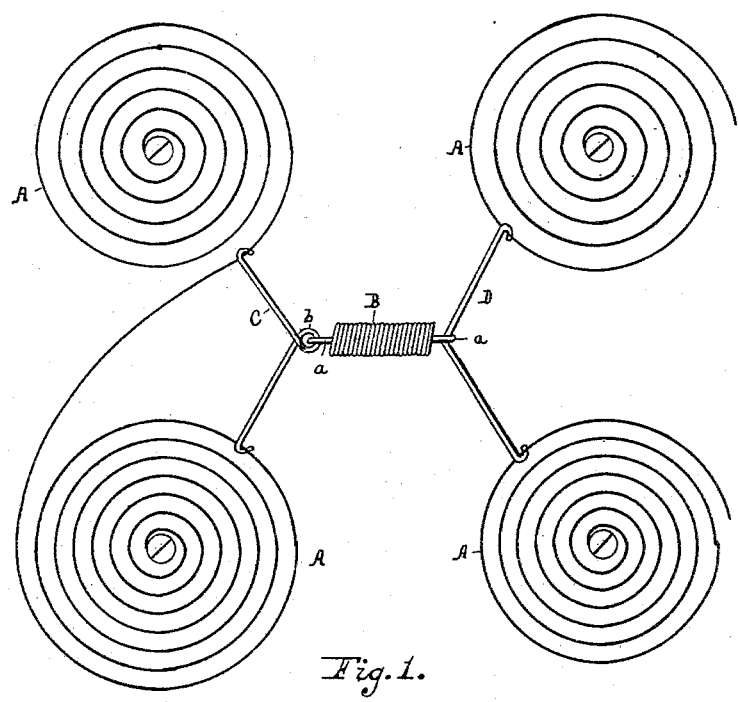
Figure 2:
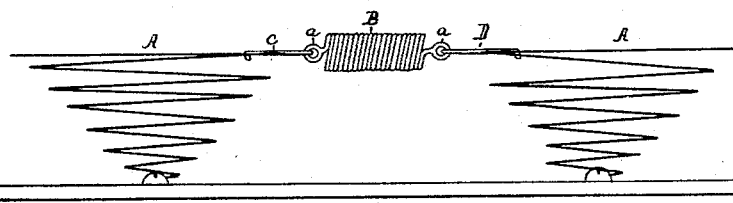

In the accompanying drawings, in which similar letters of reference indicate similar parts throughout the several views, Figure 1 is a plan of four springs connected together with my invention, and Fig. 2 is a side view of Fig. 1.

A are ordinary single or double helical bed or furniture springs. B is a tightly-wound helical spring. C and D are rods or chains by means of which B is connected to A. The springs B are furnished with hooks $a$ or their equivalents, to which the rods or chains which attach them to the springs A are secured. If rods are used, they may be either furnished with a loop $b$, as shown at $c$ in Fig. 1, or they may be plain, as at B', Fig. 1. If chains are used, the center would be secured to B and the ends to A. When the springs A are pressed down unequally, the spirals B give, and while the tops of the springs A are secured together and the said springs are kept in their proper position in relation with one another they will give freely and conform to the shape of the body resting upon them.

I am aware that spring-mattresses have heretofore been constructed of helical springs connected together by links, the whole being secured to a suitable frame, and also that helical springs have been used to connect the tops of coiled bed-springs, and hence I do not claim a helical spring, broadly, for this purpose; but What I do claim is—

In combination with the bed-springs A, the tightly-wound helical spring B, the ends of which are bent over to form rings $a$, and the rods $c$, the centers of which are secured to B at $a$ and the ends to the springs A, substantially as and for the purposes set forth.

ALONZO BELL.

Witnesses:
B. D. PAINE,
CHAS. A. RUTTER.